(12) United States Patent
Lee et al.

(10) Patent No.: US 10,125,829 B2
(45) Date of Patent: Nov. 13, 2018

(54) FUEL REDUCING CLUTCH CONTROL APPARATUS AND METHOD FOR FUEL REDUCTION USING THE SAME

(71) Applicant: WONKWANG E&TECH CO., LTD., Jeollabuk-do (KR)

(72) Inventors: Dong Geun Lee, Jeollabuk-do (KR); Byeong Cheol Baek, Jeollabuk-do (KR); Seong Cheol Lee, Jeollabuk-do (KR); Seong Jin Kim, Jeollabuk-do (KR)

(73) Assignee: WONKWANG E&TECH CO., LTD., Jeollabuk-do (KR)

( * ) Notice: Subject to any disclaimer, the term of this patent is extended or adjusted under 35 U.S.C. 154(b) by 0 days.

(21) Appl. No.: 15/311,948

(22) PCT Filed: Jun. 9, 2015

(86) PCT No.: PCT/KR2015/005780
§ 371 (c)(1),
(2) Date: Nov. 17, 2016

(87) PCT Pub. No.: WO2016/199950
PCT Pub. Date: Dec. 15, 2016

(65) Prior Publication Data
US 2017/0175829 A1   Jun. 22, 2017

(51) Int. Cl.
*F16D 48/06* (2006.01)
*B60K 23/02* (2006.01)
*F16D 48/02* (2006.01)

(52) U.S. Cl.
CPC ............ *F16D 48/066* (2013.01); *B60K 23/02* (2013.01); *F16D 25/14* (2013.01)

(58) Field of Classification Search
None
See application file for complete search history.

(56) References Cited

U.S. PATENT DOCUMENTS 5,014,832 A * 5/1991 Satoh .................... F16D 48/066
                                                        192/103 F
5,213,187 A * 5/1993 Axelsson ................ F16D 25/14
                                                        192/109 F (Continued)

FOREIGN PATENT DOCUMENTS

KR   10-2002-0035504   5/2002
KR   10-2004-0044474   5/2004

(Continued)

OTHER PUBLICATIONS

International Search Report dated Feb. 25, 2016 for PCT/KR2015/005780.

*Primary Examiner* — Justin Holmes

(57) ABSTRACT

The present disclosure relates to a clutch control apparatus, and more particularly, to a clutch control apparatus that achieves miniaturization of machinery and reduces an operational error by using a non-contact type displacement detection system using a position detecting sensor for a clutch clearance, and regulates the operation of an actuator using a plurality of solenoid valves, as a result, allowing accurate position control of a pneumatic cylinder which operates the clutch, thereby improving fuel efficiency and achieving fuel reduction as well as reducing emissions of carbon dioxide.

7 Claims, 18 Drawing Sheets

(56) References Cited

U.S. PATENT DOCUMENTS

| | | | | |
|---|---|---|---|---|
| 5,307,269 | A * | 4/1994 | Kohno | F16D 48/066 |
| | | | | 192/82 T |
| 2013/0116899 | A1* | 5/2013 | Iwao | F02D 11/04 |
| | | | | 701/54 |
| 2013/0131948 | A1* | 5/2013 | Iwao | B60W 10/02 |
| | | | | 701/93 |
| 2013/0138313 | A1* | 5/2013 | Iwao | B60T 8/172 |
| | | | | 701/67 |
| 2014/0332337 | A1* | 11/2014 | Lee | F16D 25/088 |
| | | | | 192/85.17 |
| 2016/0202719 | A1* | 7/2016 | Lippman | G05G 1/44 |
| | | | | 74/513 |

FOREIGN PATENT DOCUMENTS

| KR | 10-1216798 | 12/2012 |
|---|---|---|
| KR | 10-2013-0057649 | 6/2013 |
| KR | 10-2014-0117195 | 10/2016 |

\* cited by examiner

- Prior Art -

FUEL REDUCING CLUTCH CONTROL APPARATUS AND METHOD FOR FUEL REDUCTION USING THE SAME

This application is the National Stage application of International Application No. PCT/KR2015/005780, filed Jun. 9, 2015, which designates the United States and was published in Korean. The International Application No. PCT/KR2015/005780 is hereby incorporated by reference in its entirety into the present application.

TECHNICAL FIELD

The present disclosure relates to a fuel reducing clutch control apparatus, and more particularly, to a clutch control apparatus that achieves miniaturization of machinery and reduces an operational error by using a non-contact type displacement detection system using a position detecting sensor for a clutch clearance, and regulates the operation of an actuator using a plurality of solenoid valves, as a result, allowing accurate position control of a pneumatic cylinder which operates the clutch, thereby reducing fuel consumption and emissions of carbon dioxide.

BACKGROUND ART

A clutch is a device that connects and disconnects a pair of concentric rotary shafts easily and rapidly. The clutch is generally between a motor and an input shaft transmitted to a machine to operate or stop the machine, and causes an engine to operate in non-load state as in cars.

A clutch used in commercial cars has a power transmission function to transmit a rotating force of the engine to the transmission and a power shut-off function to temporarily block the power flow between the engine and the transmission whenever required, allowing smooth starts without vibration, protects the engine and the power transmission device against overloads, and reduces rotational vibrations of the engine together with the flywheel.

FIG. 1 shows a structure of a conventional general clutch device. As shown in FIG. 1, the clutch is configured to mainly include a clutch pedal 1 which receives a manipulation force of a driver, a master cylinder 3 which transmits the force of the clutch pedal 1, an air pump 5 which is connected to the master cylinder 3 to supply air pressure, a booster cylinder 7 having a piston rod 7a which operates with the air pressure supplied by the air pump 5, a release cylinder 9 which operates a clutch 11 with the air pressure supplied by the booster cylinder 7, a shift lever 13 hinged to the release cylinder 9 to connect the release cylinder 9 to the clutch 11. A push load 9a of the release cylinder 9 has a restoring force by a spring 9b.

In the clutch configured as above, when the driver steps on the clutch pedal 1, the force operates a piston rod 3a of the master cylinder 3 so that air pressure supplied by the air pump 5 is introduced into the booster cylinder 7 through an air pressure guiding unit 51, then the introduced air pressure moves the piston rod 7a of the booster cylinder 7, causing the push rod 9a of the release cylinder 9 to move, and with the movement of the push rod 9a, the shift lever 13 disengages a clutch disc of the clutch 11 from a driving plate of the engine, to cut off the power transmitted to the wheels.

However, the clutch must operate the clutch pedal numerously while the car stops and goes at low speeds repeatedly for a long time or drives in city, which aggravates fatigue of the driver and places strain on the driver's knees and waste.

Also, to avoid stalling the car, when the driver takes his/her foot off the clutch pedal, the driver needs to step on the accelerator pedal with a delicate foot motion for a half clutch period, and in this instance, if the driver takes his/her foot off the clutch pedal prematurely, the car shakes or the engine stalls, and on the contrary, if the driver takes his/her foot off the clutch pedal too late, power is not properly transmitted to the car, resulting in failure to driving control of the car.

To solve this inconvenience, an automatic transmission achieving automatic shifting is mounted, and in this case, advantages are convenience and comfort the driver feels during driving, but disadvantages are increases in initial purchasing price, and increased fuel consumption by about 20-30% during driving as compared to a manual transmission.

In the case of existing commercial manual cars, when the foot is taken off the accelerator pedal during driving, fuel is supplied to the engine and consumed in proportion to the driving speed (RPM), and as a solution for reducing fuel, coasting in neutral on a hill is considered, but there are inherent problems with accident risks, for example, non-application of engine braking and stopping distance.

To solve this problem, many concepts of semi-auto clutches have been proposed, but their structure is complex, causing the problem with subsequent repair and maintenance, and process of attaching to existing cars is complex. Accordingly, a clutch control apparatus with a structure that allows attaching and detaching to/from existing cars in a simple manner and convenient repair and maintenance is required.

Particularly, in the case of conventional semi-auto clutches, as a clutch operation is controlled using a motor, its rotation value is read from a potentiometer and converted to a straight line displacement value, and a clutch clearance is calculated and used for transmission control, and to this end, machinery size increases, making it difficult to mount in cars.

Furthermore, unnecessary transmission impacts occur due to an error through mechanical SLIP in the process of converting the rotation value to displacement.

DISCLOSURE OF THE INVENTION

Technical Problem

The present disclosure is designed to solve the aforementioned problem, and therefore the present disclosure is directed to providing a clutch control apparatus that achieves miniaturization of machinery and reduces an operational error by using a non-contact type displacement detection system using a position detecting sensor for a clutch clearance, and regulates the operation of an actuator using a plurality of solenoid valves, as a result, allowing accurate position control of a pneumatic cylinder which operates the clutch, thereby improving fuel efficiency and achieving fuel reduction as well as reducing emissions of carbon dioxide.

The present disclosure is directed to providing a clutch control apparatus that primarily allows the clutch to be disengaged through an electronic switch to increase convenience in gear shift, and besides achieves simple attachment and detachment to/from existing cars, provides convenient maintenance and repair of products, and allows beginner drivers to easily manipulate.

In particular, the present disclosure is directed to providing a clutch control apparatus that ensures easy driving under various driving conditions by automatically bringing into half clutch state, and arbitrarily manipulates half clutch resistant to severe condition so that beginner drivers can easily drive cars.

Furthermore, the present disclosure is directed to providing a clutch control apparatus that achieves miniaturization of machinery and reduces an operational error by using a non-contact type displacement detection system using a straight line distance sensor such as a PSD sensor for a clutch clearance as opposed to earlier technology.

Technical Solution

To solve the aforementioned problem, the present disclosure provides the following problem solving means.

The present disclosure is directed towards a clutch control apparatus connected to a booster cylinder which operates a clutch 11 to control the clutch, and the clutch control apparatus includes: a hollow first housing; a second housing provided at the rear of the first housing; an actuator module placed moveably throughout the inside of the first housing and the second housing; a cylinder which is connected to a hydraulic pressure line connected to the booster cylinder, and into which a portion of the actuator module is inserted to supply hydraulic pressure to the hydraulic pressure line with the movement of the actuator module; a position sensor which measures a straight line distance of the actuator module moving in the first housing; a pressure regulation unit provided in the first housing to regulate pressure; and a control unit which controls the pressure of the pressure regulation unit according to the distance measured by the position sensor, wherein the control unit is connected to an ECU of a vehicle via Controller Area Network (CAN) communication to collect information associated with a brake pedal, an accelerator pedal, a clutch pedal, a clearance of an engine brake, a vehicle speed and an engine rotation frequency, and receives input of a position signal of the actuator module through the position sensor, and controls solenoid valves which form the pressure regulation unit for operation of the actuator module.

The actuator module includes:

a body which is moveable in a straight direction within the first housing and is provided with an hydraulic pressure regulating rod in front thereof, a cylinder which is connected to an hydraulic pressure line connected to the booster cylinder, and into which a portion of the hydraulic pressure regulating rod is inserted to supply hydraulic pressure to the hydraulic pressure line with the movement of the body, a piston head which is moveable in a straight direction within the second housing by a pressure difference between a first chamber and a second chamber, wherein the second housing is divided into the first chamber and the second chamber, each chamber being sealed, and a piston rod which connects the piston head to the body.

The pressure regulation unit is connected to a compression pump disposed outside through an air passage pipe, and the pressure regulation unit includes:

a plurality of orifices through which air flows between the air passage pipe and the second housing, and a plurality of solenoid valves which is controlled according to a signal of the control unit and regulates opening and closing of the plurality of orifices.

In this instance, the clutch control apparatus further includes a reflection plate which moves with the body, wherein the sensor unit is fixed to the first housing to measure a straight distance from the reflection plate.

Also, the clutch control apparatus may further include an elastic member provided in the second chamber, wherein the elastic member has a restoring force to push the piston head toward the first chamber.

In particular, the clutch control apparatus further includes a valve which connects the cylinder to a master cylinder configured to supply hydraulic pressure by manipulation of a clutch pedal, and a sensor which recognizes whether the clutch pedal is pressed, wherein when the clutch pedal being pressed is recognized through the sensor, the valve is opened, operation of the compression pump is stopped by the control unit, and the solenoid valves are opened.

Advantageous Effects

According to the present disclosure, miniaturization of machinery is achieved and an operational error is reduced by using a non-contact type displacement detection system using a position detecting sensor for a clutch clearance, the operation of an actuator is regulated using a plurality of solenoid valves, as a result, allowing accurate position control of a pneumatic cylinder which operates the clutch, thereby improving fuel efficiency of vehicle and achieving fuel reduction.

The present disclosure provides an optimal driving environment for fuel efficiency improvement by transmitting and receiving data related with vehicle speed, engine rotation frequency, amounts of fuel supply and clutch pedal to/from an ECU of vehicle via CAN communication, and collecting accurate position information through a clutch switch, a clutch pedal operation sensor, and an actuator position sensor to regulate the driving mode in real time.

Furthermore, there is an effect on the provision of a clutch control apparatus that achieves simple attachment and detachment to/from existing vehicles, provides convenient maintenance and repair of products, and allows beginner drivers to easily manipulate.

In addition, as opposed to earlier technology, there are effects on miniaturization of machinery and reduction in operational error by using a non-contact type displacement detection system using a straight line distance sensor such as a PSD sensor for a clutch clearance.

MODE FOR CARRYING OUT THE INVENTION

Hereinafter, the present disclosure will be described in detail with reference to the accompanying drawings.

Rather, in the description of the present disclosure, when a certain detailed description of related known functions or configuration is deemed to render the nature of the present disclosure ambiguous, its detailed description is omitted herein. Prior to the description, it should be noted that even though the same term is used, different reference symbols may be used if the same term indicates different components.

In addition, the terms used herein are set in consideration of functionality in the present disclosure, and may be changed as intended by users such as experimenters or measurers or according to custom, and thus each term should be defined based on the disclosure throughout the specification.

Figure 1:
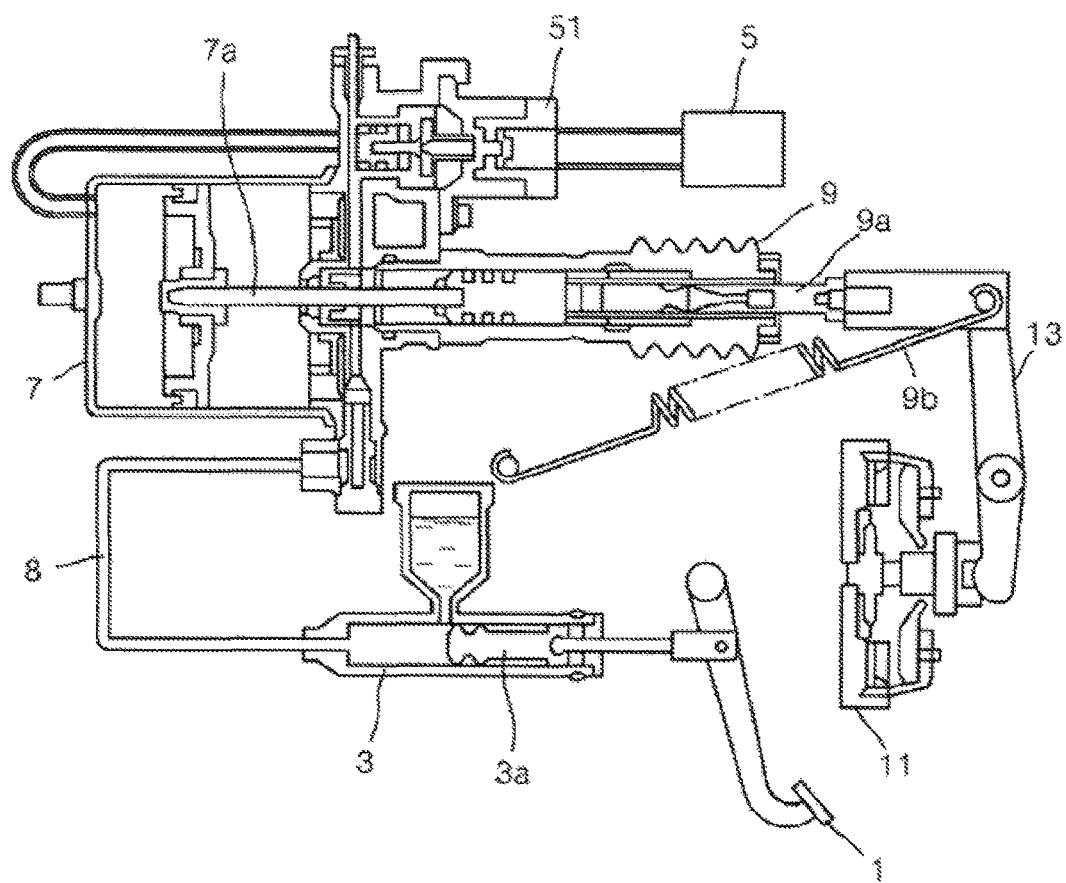
FIG. 1 is a diagram showing a structure of a general clutch.
Figure 2:
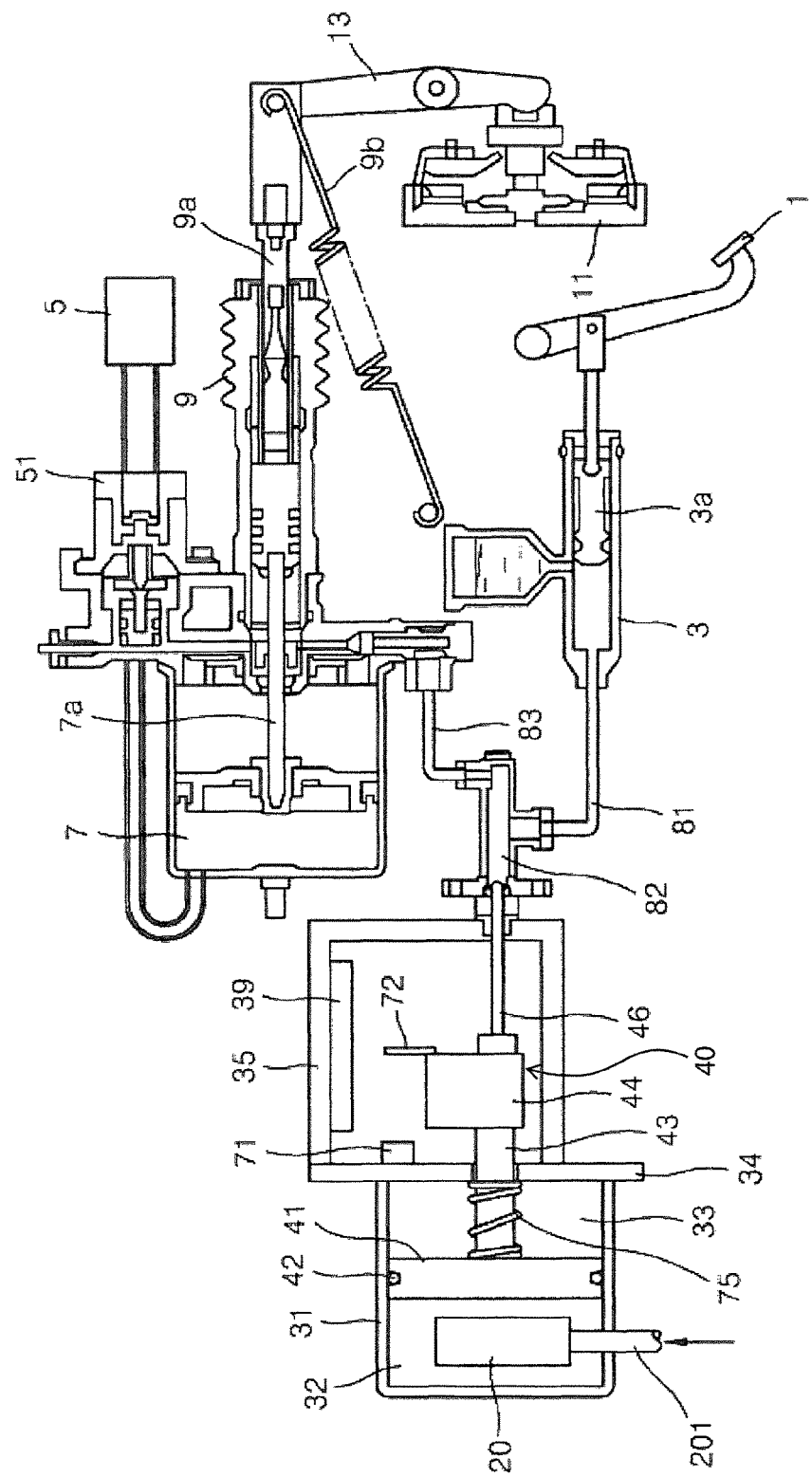
FIG. 2 is a diagram showing a clutch control apparatus according to the present disclosure when mounted.

FIG. 2 is a diagram showing that a clutch control apparatus according to the present disclosure is coupled to an existing clutch. Rather, the diagram was depicted in brief to emphasize key parts of the present disclosure.

The present disclosure is directed towards a clutch control apparatus connected to a booster cylinder 7 which operates a clutch 11 to control the clutch, and the clutch control apparatus is connected to a clutch pedal 1 through a master cylinder 3.

The clutch control apparatus according to the present disclosure is largely divided into a first housing 35 and a second housing 31 disposed at the rear of the first housing 35. The term "rear" as used herein refers to a direction facing away a cylinder 82, and the term "front" as used herein refers to a direction facing the cylinder 82, with respect to FIG. 2.

Also, the key of the present disclosure consists in a pressure regulation unit 20 within a first chamber 32 as described below, and although a compression pump which supplies compressed air to the pressure regulation unit 20 is not shown, it should be understood that they are connected through an air passage pipe 201.

The clutch control apparatus according to the present disclosure includes a first housing 35, a body 44 which is moveable in a straight direction within the first housing 35 and is provided with a hydraulic pressure regulating rod 46 in front thereof, and a cylinder 82 which is connected to a hydraulic pressure line 83 connected to the booster cylinder 7 and into which a portion of the hydraulic pressure regulating rod 46 is inserted to supply hydraulic pressure to the hydraulic pressure line with the movement of the body 44.

The present disclosure is characterized in that the body 44 makes a straight line movement, and the straight line movement distance of the body 44 is directly measured and used for clutch control. Earlier technology that used a stepping motor and performed position control by a rotation sensor was published, but because process which measures a straight line value as a rotation value and converts to the straight line value again is needed, response performance was very unstable, and in particular, in the event that the stepping motor wears out, there was a potential risk that an error in position control occurs.

To solve this problem, the present disclosure performs position control through a straight line distance measuring sensor such as a PSD sensor except a stepping motor to give an accurate linear value, and can avoid a risk of abrasion due to its non-contact type, so an advantage is high durability.

Also, a stepping motor used conventionally is very sensitive to dampness, and a clutch control apparatus is mounted in a lower part of a vehicle due to its properties, causing many problems related to damp-proof. Therefore, the present disclosure is characterized by performing position control using a solenoid valve having very good damp-proofing performance.

To this end, a sensor unit 71 is provided to measure the straight line movement distance of the body 44 within the first housing 35. The sensor unit 71 is intended to measure a relative straight line movement distance of the body 44 as described in the foregoing. Thus, any sensor capable of measuring a straight line distance, including a PSD sensor, an ultrasonic sensor and an infrared sensor, is available.

To increase the distance measurement performance, a reflection plate 72 which moves with the body 44 may be further provided. The sensor unit 71 is fixed to the first housing 35, and as the reflection plate 72 moves with the movement of the body 44, measures the moved straight line distance.

The measured distance between the sensor unit 71 and the reflection plate 72 is transmitted to a control unit 39 via communication, and is used as a basis for control of the solenoid valve.

Hereinafter, the operation principle of the body 44 will be described in more detail.

A second housing 31 provided at the rear of the first housing 35 is further provided, and is divided into a first chamber 32 and a second chamber 33, each chamber being sealed, and a piston head 41 is further provided, which can move in a straight direction within the second housing 31 by a pressure difference between the first chamber 32 and the second chamber 33.

The piston head 41 is connected to the body 44 by a piston rod 43.

In the present disclosure, a module including the piston head 41, the piston rod 43, the body 44 and the hydraulic pressure regulating rod 46 may be set as an actuator module 40.

The piston head 41 moves along the second housing 31 according to the pressure in the first chamber 32. The piston head 41 may further include a piston ring 42 to seal the first chamber 32 and the second chamber 33.

More preferably, the pressure in the first chamber 32 may change, and the pressure in the second chamber 33 is maintained at a constant value, for example, in atmospheric pressure or vacuum state. That is, a structure allowing pressure regulation only in the first chamber 32 will be economical.

To this end, an elastic member 75 having a restoring force to push the piston head 41 toward the first chamber 32 may be further provided in the second chamber 33. As shown in the drawing, the elastic member is provided in the shape of a spring wrapping the piston rod 43, with one end fixed to the piston head 41 and the other end fixed to a boundary wall between the first housing 35 and the second housing 31.

When the pressure in the first chamber 32 is low, the piston head 41 tends to move toward the first chamber 32 by the restoring force of the elastic member 75, and when the pushing force by the pressure in the first chamber 32 is greater than the restoring force of the elastic member 75, the piston head 41 moves toward the second chamber 33.

That is, it should be understood that the present disclosure is characterized by controlling the movement of the piston head 41 by regulating the pressure in the first chamber 32 and controlling the movement of the body 44 connected thereto.

To this end, the present disclosure includes a pressure regulation unit 20 provided in the first chamber 32 to regulate the pressure, and a control unit 39 to control the pressure of the pressure regulation unit 20 according to the distance measured by the sensor unit 71. The movement of the actuator module 40 toward the cylinder 82 is regulated by regulating the pressure in the first chamber 32 through the pressure regulation unit 20.

The pressure regulation unit 20 is connected to a compression pump (not shown) disposed outside through the air passage pipe 201. The compression pump is also provided to supply compressed air to the pressure regulation unit 20, or on the contrary, discharge air in the first chamber 32 to the outside through the pressure regulation unit 20, according to signals of the control unit 39.

Figure 3:
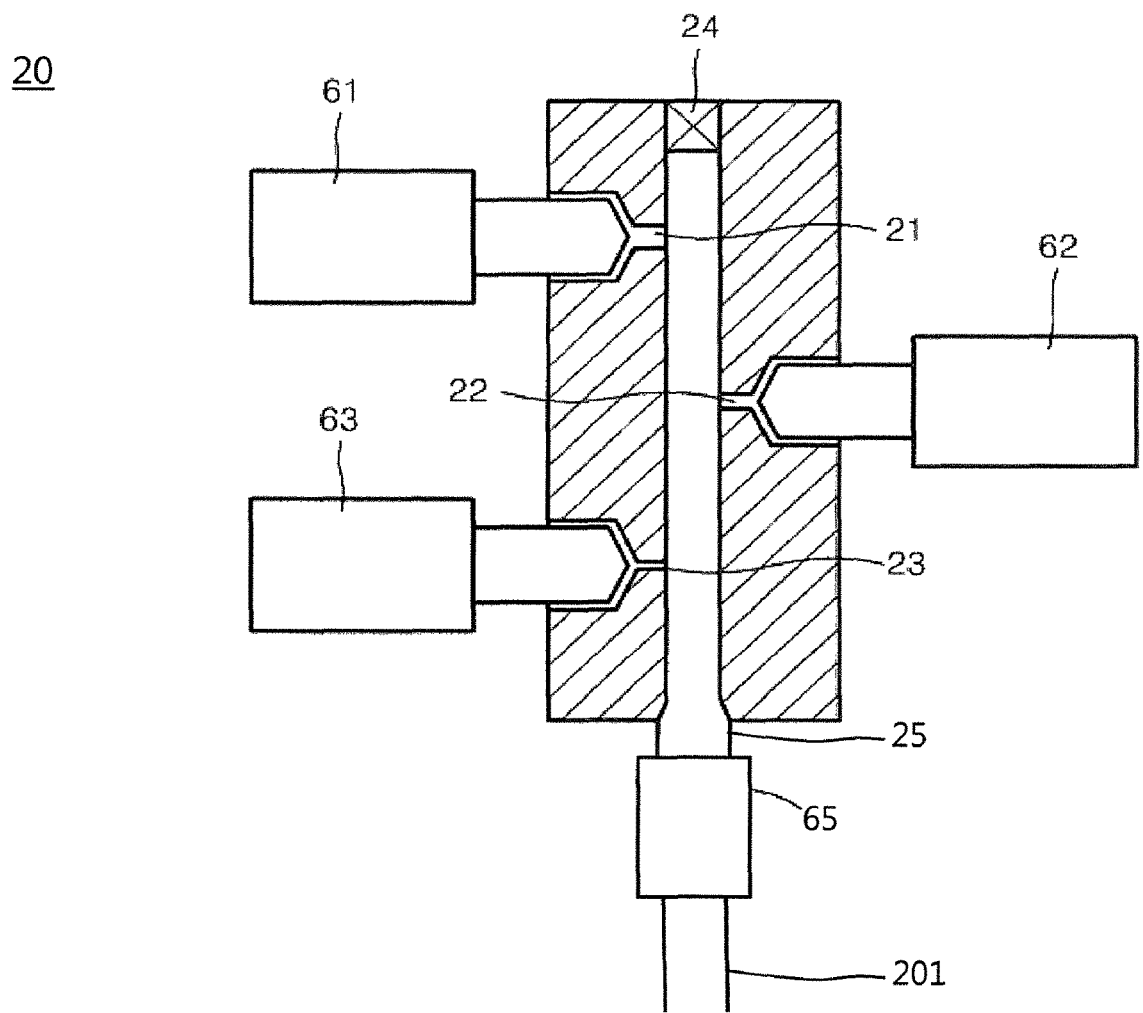
FIGS. 3 through 5 are diagrams showing a structure of a pressure regulation unit used in a clutch control apparatus according to the present disclosure.

As shown in FIG. 3, the pressure regulation unit 20 has a body with an inner pipe 25 connected to the air passage pipe 201. The inner pipe 25 has a plurality of orifices 21, 22, 23.

The present disclosure is characterized by mounting each solenoid valve 61, 62, 63, 65 on the plurality of orifices 21, 22, 23 and the air passage pipe 201, and opening and closing the air passage pipe 201 or the orifices using the solenoid valves in accordance with a preset program. Through this, the pressure of the first chamber 32 is regulated by regulating an amount of air introduced to the first chamber 32 from the pressure pump or an amount of air discharged outside from the first chamber 32 when the pressure pump is in off-state.

To this end, the plurality of orifices 21, 22, 23 through which air flows between the air passage pipe 201 and the first chamber 32, and the plurality of solenoid valves 61, 62, 63, 65 is controlled according to signals of the control unit 39 and regulates the opening/closing of the plurality of orifices 21, 22, 23. Here, the number of solenoid valves can be appropriately increased or decreased. Also, the plurality of solenoid valves 61, 62, 63, 65 may include three discharge solenoid valves 61, 62, 63 and an input solenoid valve 65.

For the solenoid valves, their on/off is pre-programmed and stored according to a value of the movement distance of the actuator module 40 or the body 44 measured by the sensor unit 71, and accordingly, the control unit 39 transmits an operation signal value to the solenoid valves. Each solenoid valve turns on/off individually, and the sum of all orifices opened by the solenoid valves becomes the total open area.

For more accurate pressure regulation, a plurality of orifices is used, and in particular, each orifice is formed with different diameters.

For example, in the case of the present disclosure, the plurality of orifices includes a first orifice 21, a second orifice 22 and a third orifice 23, each having different diameters, and the plurality of solenoid valves includes a first solenoid valve 61, a second solenoid valve 62, a third solenoid valve 63, and a fourth solenoid valve 65.

In this instance, assume that the area of the first orifice 21 is laid, the area of the second orifice 22 is 0.5 mm$^2$, and the area of the third orifice 23 is 0.1 mm$^2$. In this case, various on/off combinations of each solenoid valve can be made so that the area of orifices opened by the combinations is 0.1, 0.5, 0.6, 1.0, 1.1, 1.5, 1.6.

If it is assumed that all the orifices have the same area of 0.5 mm$^2$, the area of orifices opened by on/off combinations of each solenoid valve is only three areas of 0.5, 1.0, and 1.5, which is unfavorable for accurate position control.

Figure 4:
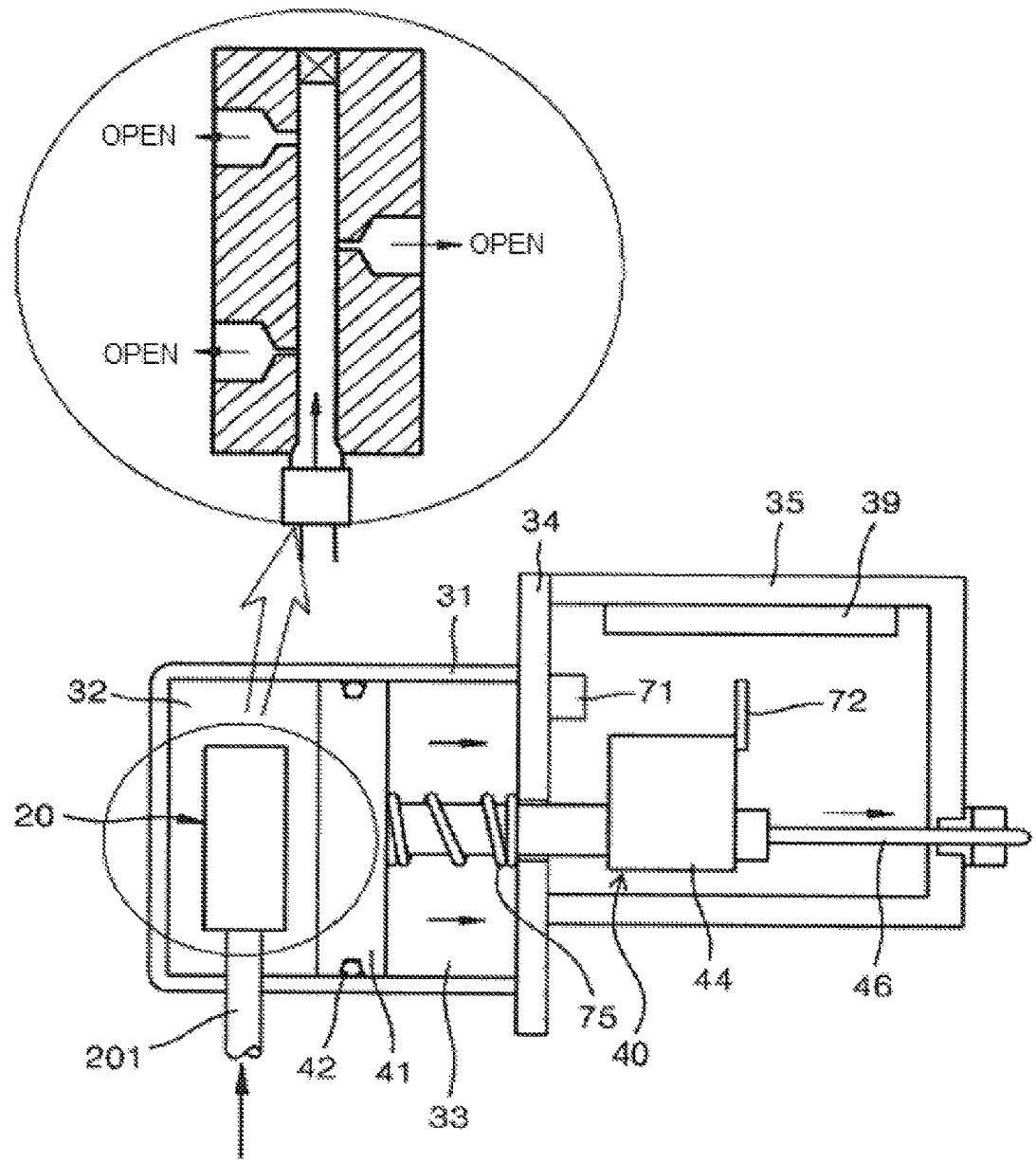
Figure 5:
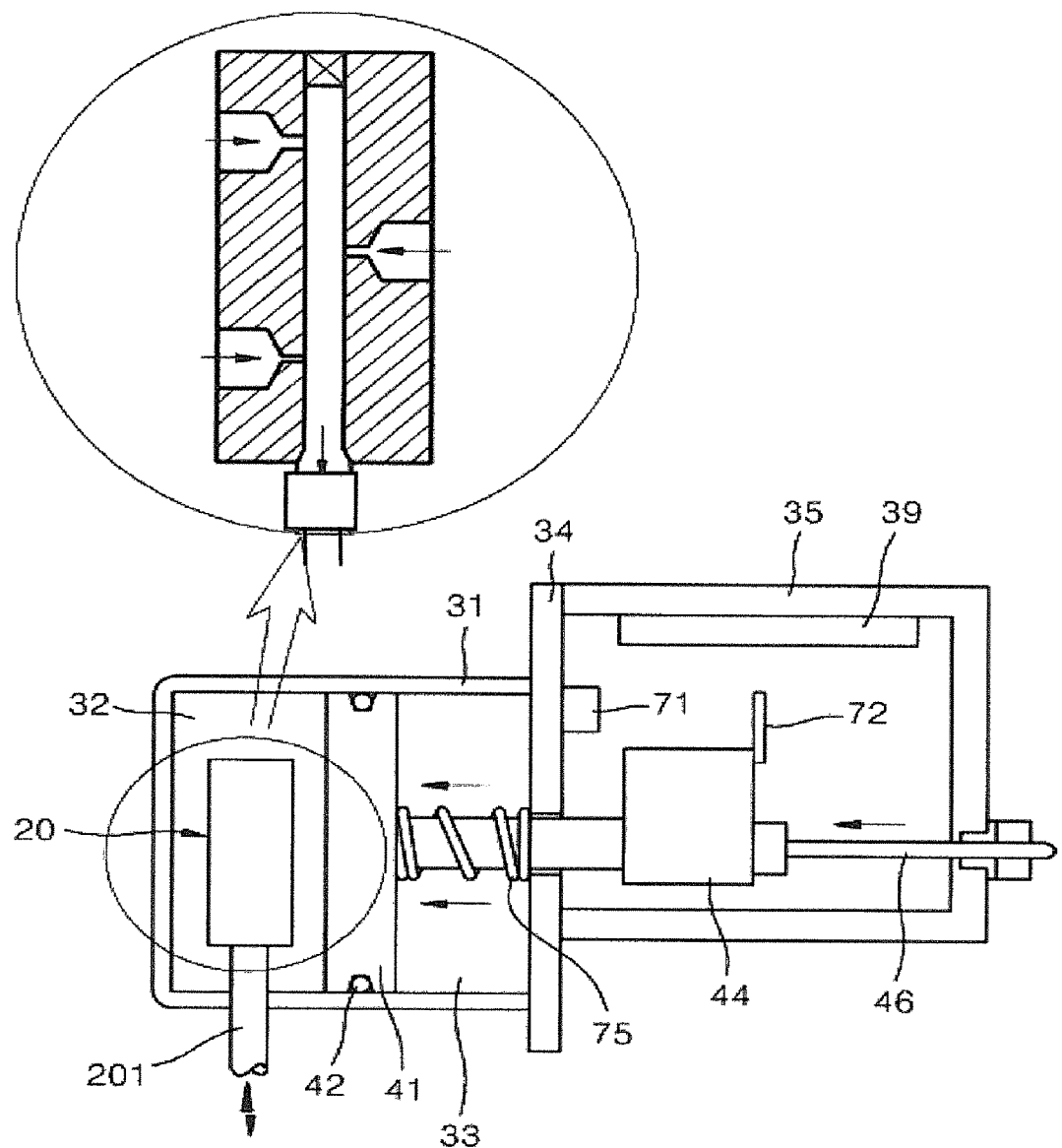
Figure 6:
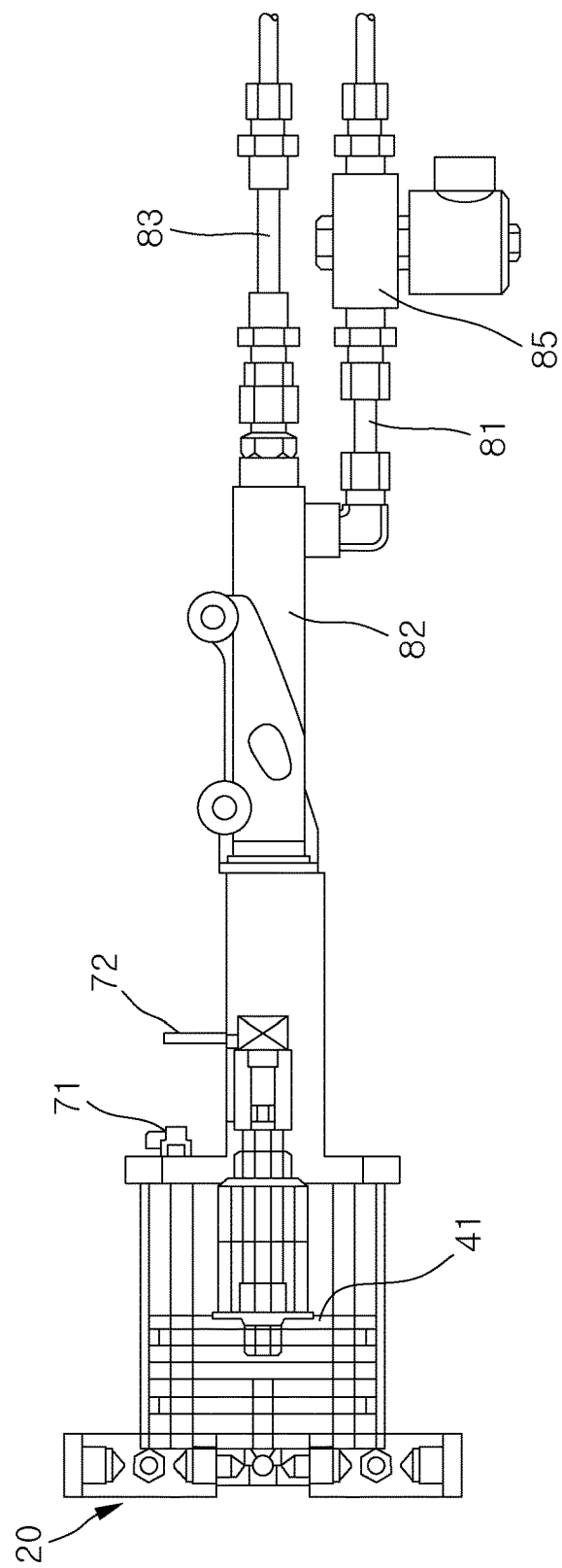
FIG. 6 is a diagram showing a clutch control apparatus according to the present disclosure when mounted.

FIGS. 4 and 5 illustrate the operation principle of the clutch control apparatus depending on the closing/opening of the orifices by the manipulation of the solenoid valves.

FIG. 4 shows that solenoid valves operate to open each orifice in the situation in which the external pressure pump is in operation. In this case, compressed air is introduced into the first chamber 32 through the orifices, and the pressure of the first chamber 32 rises.

In this case, the piston head 41 moves toward the second chamber 33 (frontward), and the hydraulic pressure regulating rod 46 disposed in front of the body 44 supplies the hydraulic pressure of the cylinder 82 the hydraulic pressure line 83.

Generally, the present disclosure is characterized by regulating the speed at which the piston head 41 moves toward the first chamber 32 along the elastic member 75 after moving forwards.

This is the principle whereby air in the first chamber 32 is discharged through opened orifices in a state that the operation of the external compression pump is turned off, as shown in FIG. 5. In this case, the present disclosure is characterized by regulating the open area through combinations of opening or closing of each orifice through each solenoid valve.

By regulating the open area, the speed at which the piston head 41 is pushed rearwards is regulated, and ultimately, the engagement and disengagement speed of the clutch device is regulated.

Also, the present disclosure is characterized by further including a valve 85 connecting the cylinder 82 to the master cylinder 3 which supplies the hydraulic pressure by the manipulation of the clutch pedal 1, and a sensor which recognizes whether the clutch pedal 1 is pressed, and when the clutch pedal 1 being pressed is recognized through the sensor, the valve is opened, the operation of the compression pump is stopped by the control unit 39, and the solenoid valve is opened.

In this case, for the valve 85, it is preferred to use a 2-WAY valve. This valve is structured such that it is closed at normal time, and at the moment when the driver steps on the clutch manually, it is opened by a sensor which measures this, allowing a fluid to flow in the hydraulic pressure line. When the valve is opened, the compression pump is immediately shifted to an off state, all the solenoid valves are opened and the body 44 is retreated rearwards.

Rather, this manual operation should be connected to manipulation of the brake and the accelerator as well as manipulation of the clutch. That is, in addition to the clutch, the brake and the accelerator may be each provided with a sensor to detect whether they are pressed, and when pressing is detected, the same function is performed.

Also, as shown in FIG. 3, the inner pipe 25 is further provided with an auxiliary valve 24, and in this situation, the auxiliary valve 24 may be also opened instantly to lower the pressure in the first chamber 32 within a shortest time.

Figure 7:
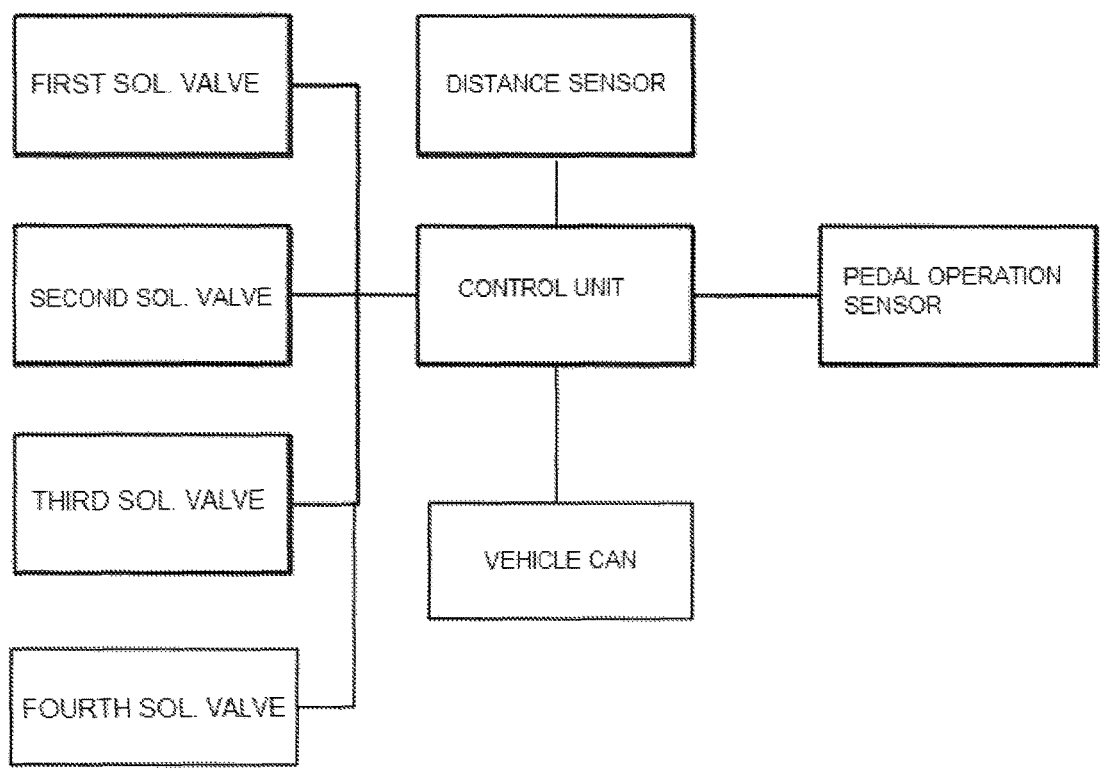
FIG. 7 is a block diagram of a clutch control apparatus according to the present disclosure.

FIG. 7 is a block diagram showing the operational relationship of each solenoid valve by the control unit according to the present disclosure. The control unit is connected to each sensor, and accordingly controls the valves to operate.

The control unit is configured to be connected to the ECU of the vehicle via Controller Area Network (CAN) communication to collect information of the vehicle, receive inputs of position signals through the distance sensor to identify the operation of the actuator module 40, and control the solenoid valves 61, 62, 63, 65 for operation of the actuator module 40. Also, the pedal operation state of the driver can be additionally identified through a pedal operation sensor. CAN communication is a message based protocol, which is the standard for communication designed for microcontrollers or devices to communicate with each other without a host computer in the vehicle.

CAN communication-related data is information associated with the vehicle speed, the engine rotation frequency, the brake pedal, the accelerator pedal, the clutch pedal and the engine brake, and the sensor includes a clutch switch, a clutch pedal operation sensor, a fuel supply flow rate sensor, and a position sensor of the actuator module 40.

The present disclosure is intended to attach the apparatus according to the present disclosure to an existing manual clutch device with an aim of improving fuel efficiency of the vehicle, thereby achieving program optimization through automatic control, and specifically, the present disclosure designs and applies an operation mode that is divided into normal driving condition and coasting condition. The operation mode refers to preset situations that may occur in the normal driving condition and the coasting condition, and vehicle information to be collected via CAN communication and a sensor are selected and a resulting output is designed as a timing chart.

Trucks are used to carry heavy loads as opposed to cars, and to increase fuel efficiency of trucks, it is necessary to drive trucks in consideration of the type, size and weight of loads, and because most of vehicles carry loads heavier than their own weight, choosing to perform coasting drive according to road conditions rather than keeping a constant speed while driving will be effective for fuel efficiency improvement.

Coasting is based on the principle that fuel supply is minimized by temporarily separating power transmission during driving, and has a similar concept to a fuel-cut driving method. When driving over a predetermined RPM in a manual transmission, if the foot is taken off the accelerator pedal, power transmission is automatically separated from the clutch to cut off power from the engine, allowing drive on a minimum of fuel supply, in other words, a fuel reduction method using the inertia of the vehicle on fuel supplied necessary only to keep basic RPM (800-900 rpm with running engine while the vehicle is stationary).

Automatic fuel-cut functions may vary in each vehicle model, but are applied at about roughly 1,600 rpm or higher in a state that the brake and accelerator pedals are not pressed while driving. For example, in the fuel-cut driving method, when a driver steps on the accelerator pedal during driving to travel at 3,000 rpm and then takes his/her foot off the accelerator pedal, Engine Control Unit (ECU) determines that the driver will not accelerate and cuts off fuel supply, so the driver keeps driving by the inertia of the vehicle in a state that fuel supply is stopped. Also, when driving downhill in a lower gear with the engaged clutch, the vehicle is maintained at high engine rotation frequency by the force while going downhill, and resulting in fuel cut, and through this, fuel efficiency can be improved.

In contrast, when the accelerator pedal is pressed during driving to travel at 3,000 rpm, and then the foot is taken off the accelerator pedal, the fuel reducing clutch control apparatus according to the present disclosure automatically disengages the clutch to cut off power from the engine and lowers the rotational speed of the engine to the basic RPM (800-900 rpm) to minimize fuel supply, and through this, fuel efficiency is improved. In the end, this can reduce emissions of carbon dioxide through reduction in the fuel used.

The present disclosure installs the booster cylinder and the hydraulic pressure supply line of the clutch control apparatus for common use, and when the automatic clutch control apparatus mounted is used, the line of the existing booster cylinder is closed, and when the existing clutch pedal is operated, the clutch control apparatus is released and can be used by the driver's selection. Even in the case that an operational error occurs in the clutch control apparatus, the existing clutch operation can be used with highest priority, so driving is not disrupted and there is no need to change the structure of the vehicle.

The following is a description of normal driving condition by the application of the present disclosure. The normal driving condition defines a semi-auto clutch operation of the transmission process while the vehicle is driving and the stop process.

Figure 8:
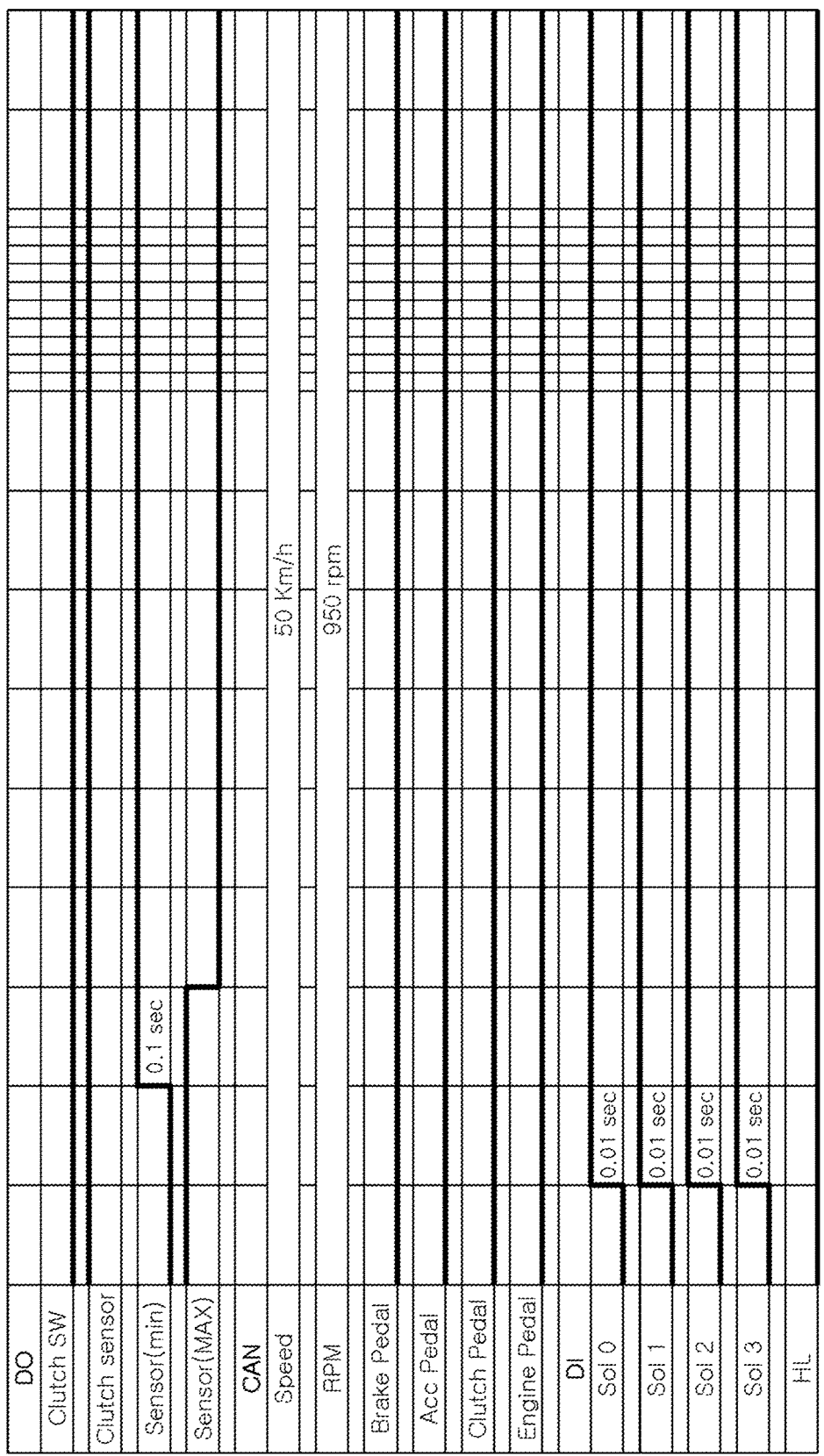
FIGS. 8 through 13 are timing charts showing various modes in normal driving condition.

Referring to FIG. 8, clutch operation control in the transmission while driving at low speed of less than 10 km/h is shown, and on low speed driving, high friction torque occurs when engaging the clutch, the clutch is not engaged at once and the clutch is engaged after maintaining at half clutch.

Figure 9:
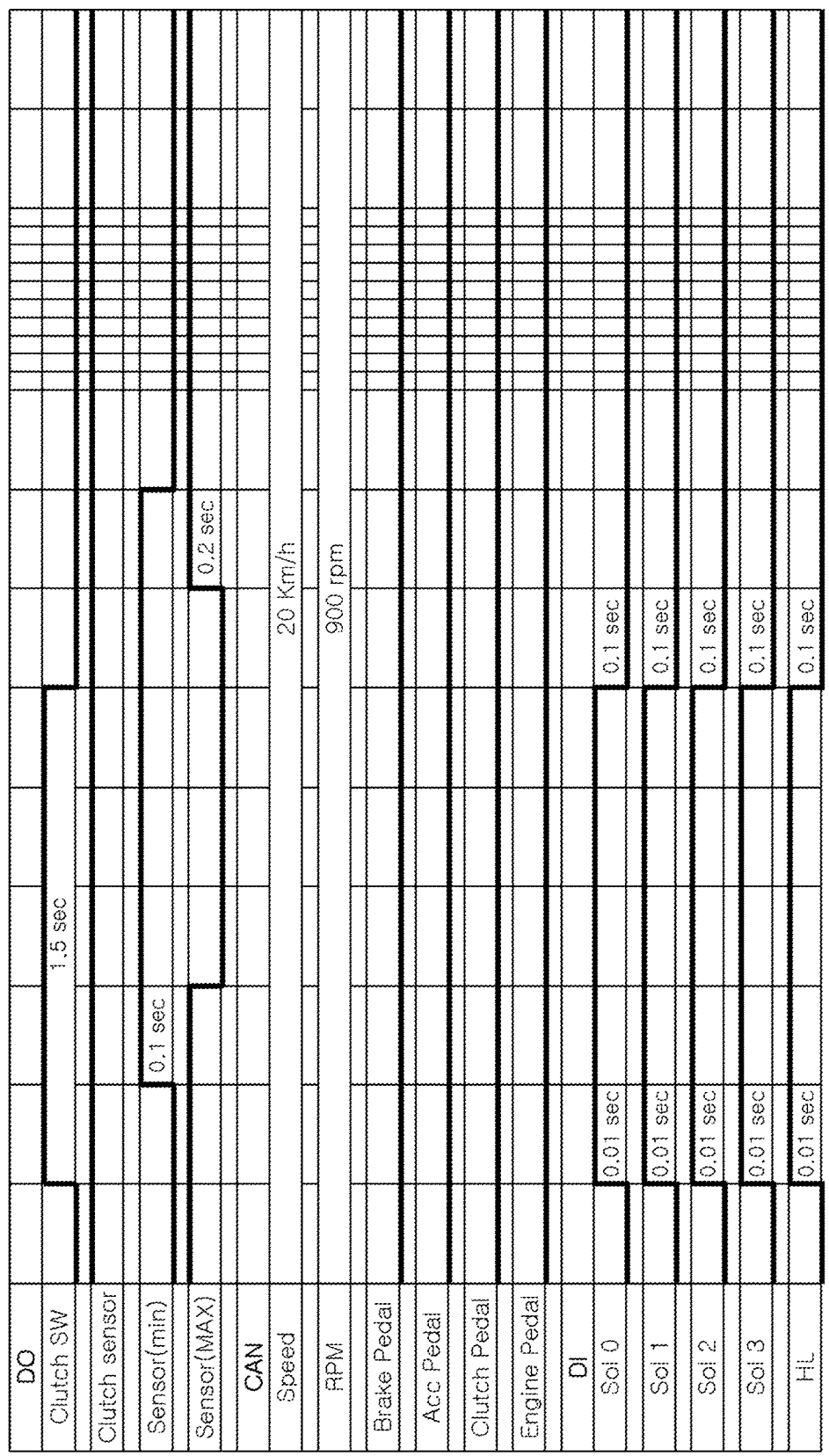

Referring to FIG. 9, clutch operation control in the transmission while driving at the vehicle speed of 10 km/h or higher is shown, and in this instance, as the driving friction torque is lower than the operating torque, even though the clutch is engaged at once, a great shock does not occur, so the clutch is engaged without a half clutch operation.

Figure 10:
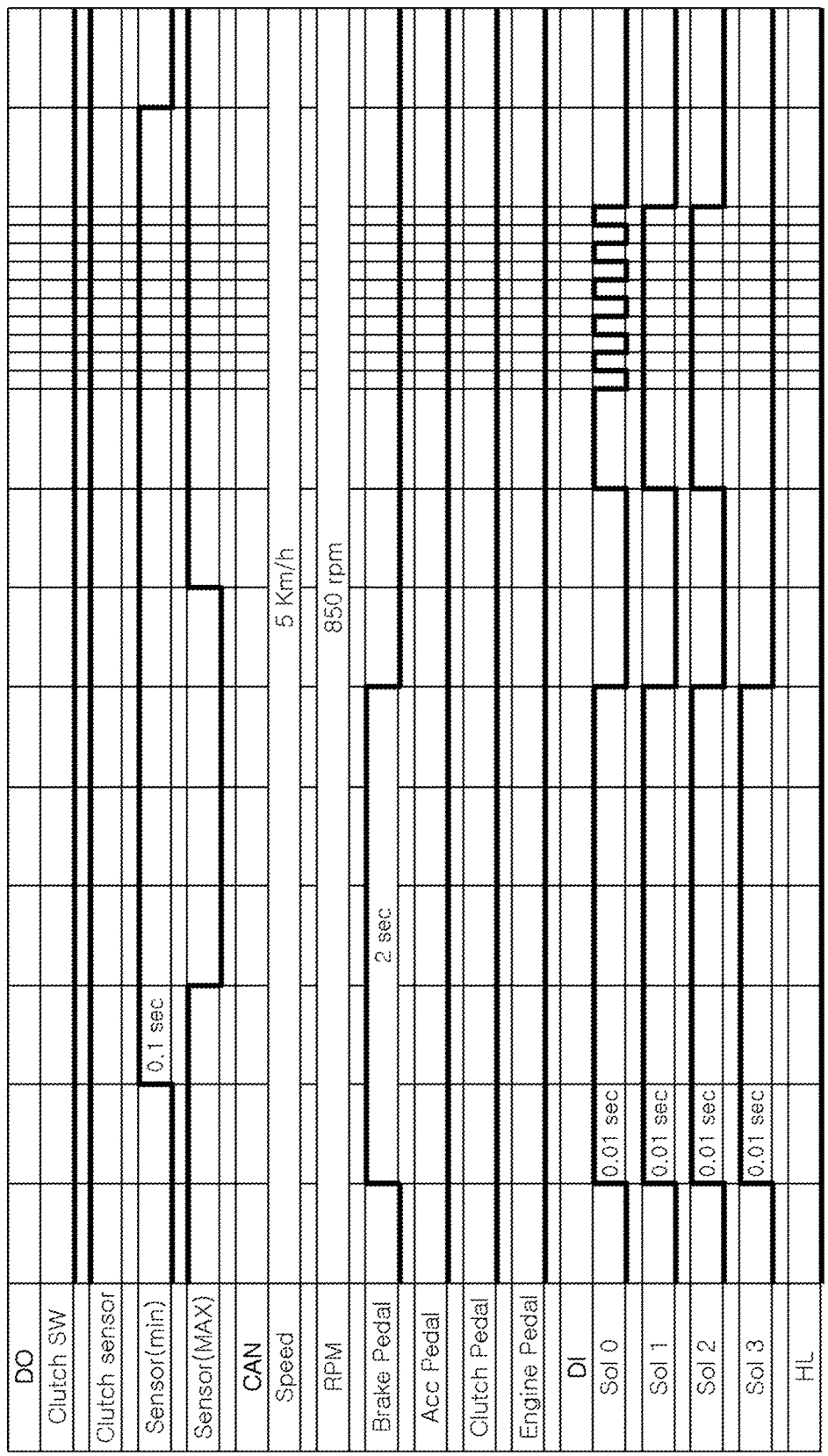

Referring to FIG. 10, when the brake pedal is pressed at the vehicle speed of less than 10 km/h and the engine rotation frequency of 900 rpm or less, the clutch is disengaged, and when the brake pedal is released, the clutch is engaged again. In this instance, because it is in low speed state, the clutch is engaged after maintaining at half clutch.

Figure 11:
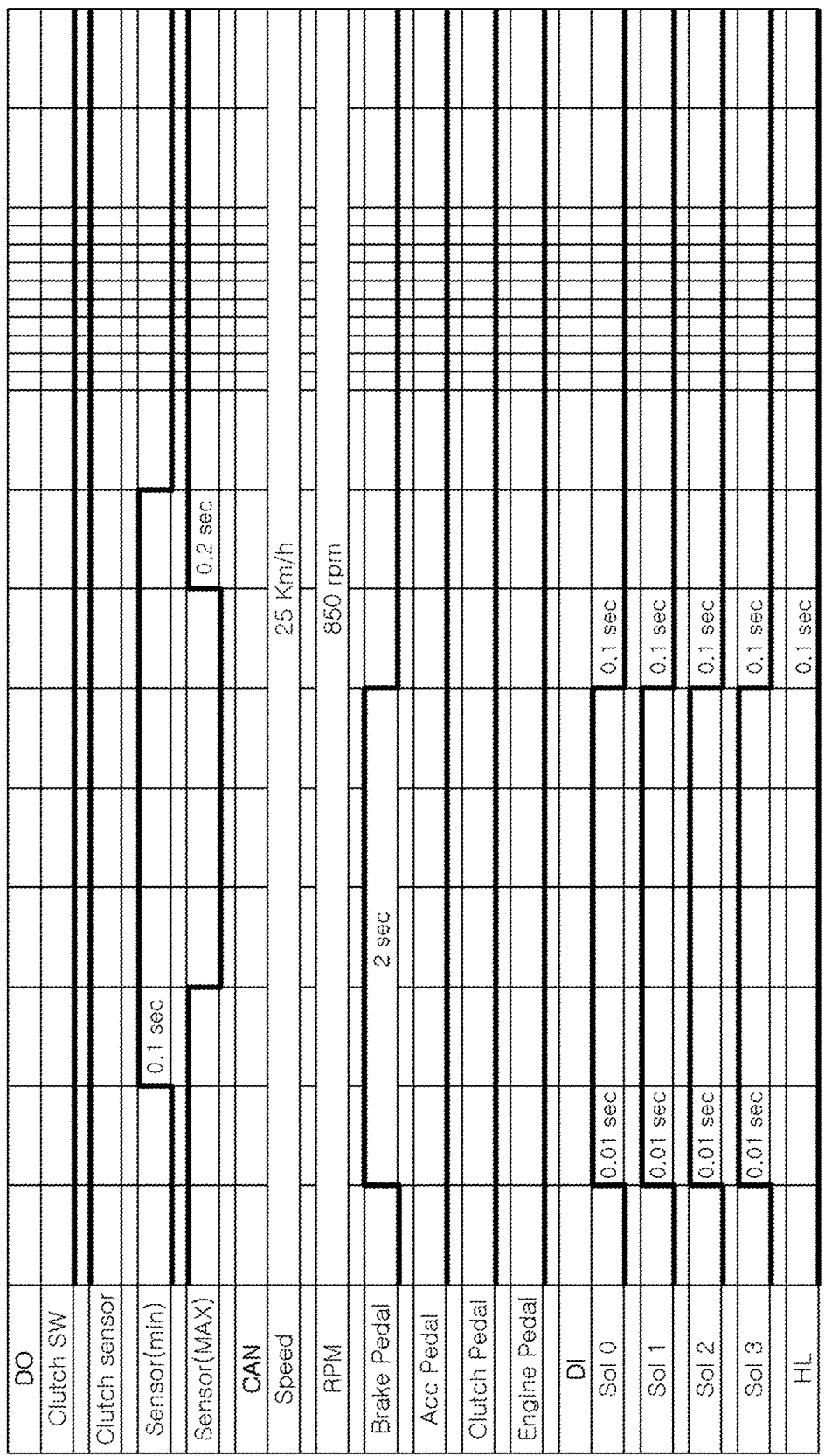

Referring to FIG. 11, in the case that the brake pedal is pressed and then the foot is taken off the brake pedal at the vehicle speed of 10 km/h or higher and 30 km/h or less and the engine rotation frequency of 900 rpm or less, when the brake pedal is pressed, the clutch is disengaged, and when the foot is taken off the brake pedal, the clutch is engaged. In this instance, because it is moderate speed driving, the clutch is engaged at once without maintaining at half clutch.

Figure 12:
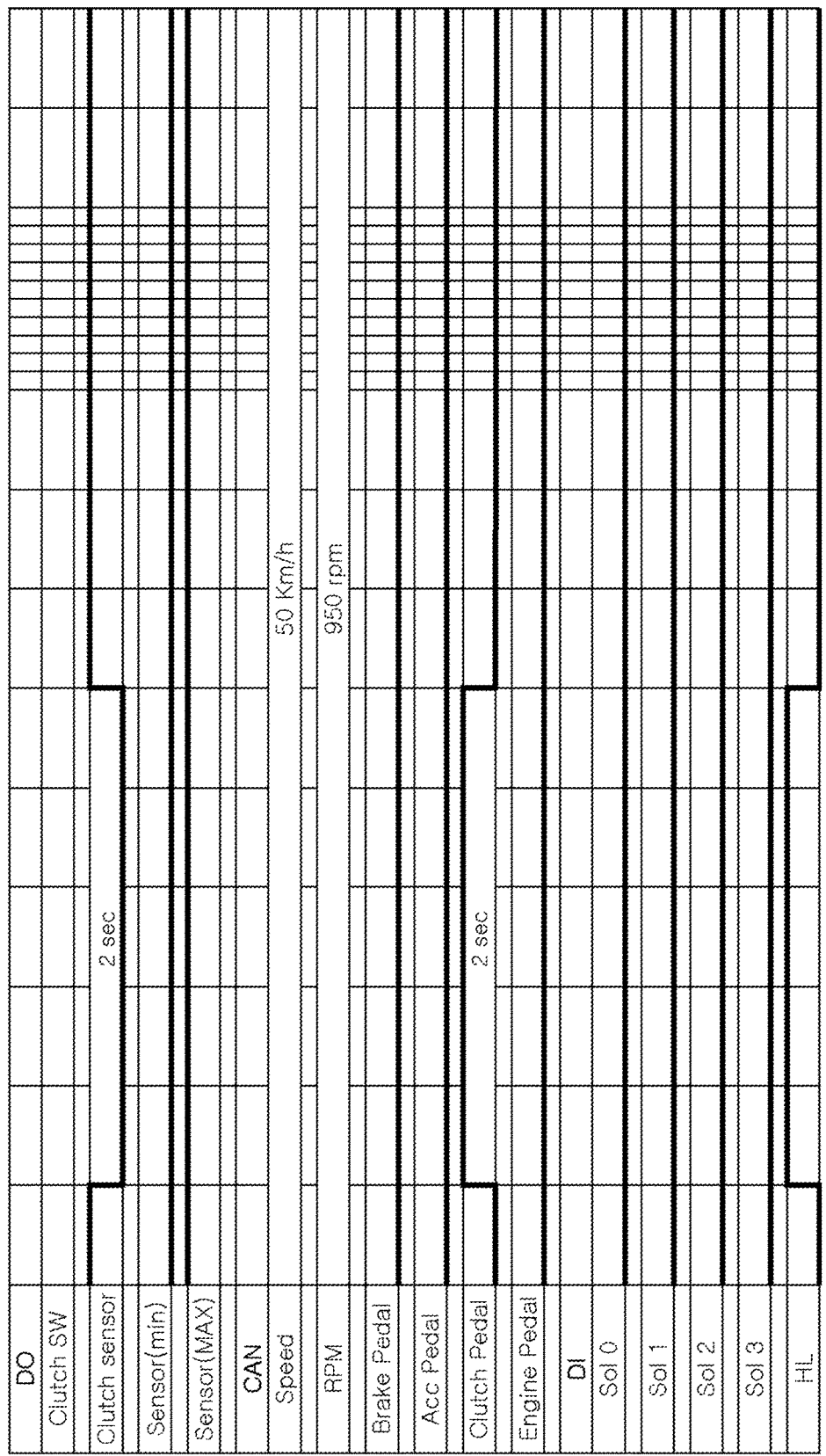

Referring to FIG. 12, while driving with the engaged clutch, when the driver steps on the clutch pedal, the semi-auto clutch is disallowed to operate. This is because priority was placed on the operation by the clutch pedal to eliminate the problem with uncertainty of control that occurs when the clutch pedal and the semi-auto clutch operate at the same time.

Figure 13:
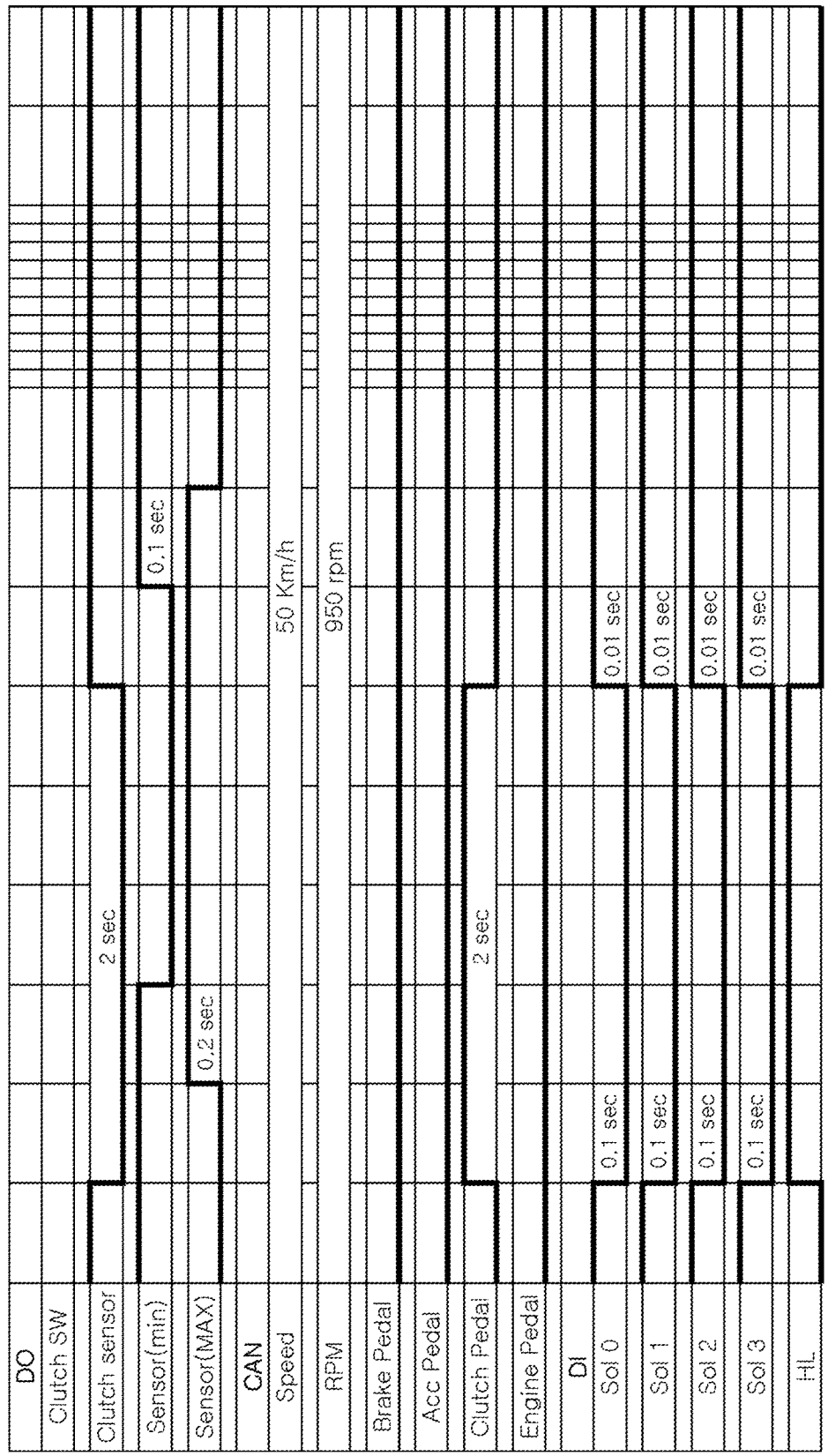

Referring to FIG. 13, while driving with the disengaged clutch, when the driver steps on the clutch pedal, because the clutch pedal operation is to be controlled with priority, the semi-auto clutch is shifted to engagement and maintains its initial state, and is controlled by the clutch pedal.

Shifting from normal driving condition to coasting condition by the application of the present disclosure is as follows.

Figure 14:
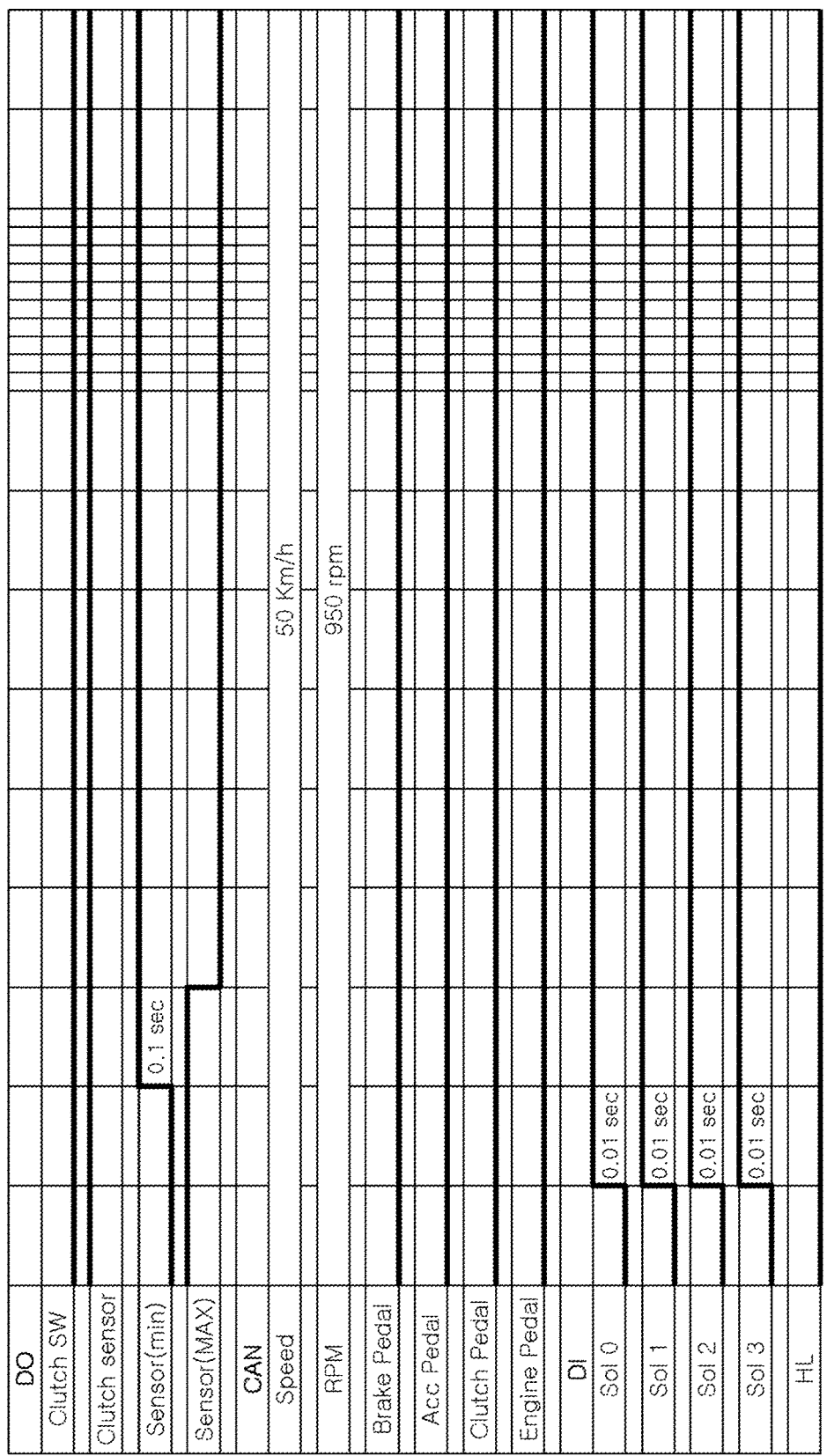
FIGS. 14 through 18 are timing charts showing various modes in coasting condition.

Referring to FIG. 14, driving using the inertia of the vehicle by disengaging the clutch without an operation on the accelerator pedal at a preset speed or higher is shown, and to this end, when traveling over a preset speed for the coasting mode while driving, the control unit disengages the clutch.

Using the vehicle speed of 50 km/hr and the engine rotation frequency of 900 rpm as a reference value preset to the control unit 39, the present disclosure shifts to the coasting condition when the actually measured vehicle speed and engine rotation frequency exceeds the reference value.

The control unit 39 controls the solenoid valves 61, 62, 63, 65 that form the pressure regulation unit 20 for operation of the actuator module 40. The solenoid valves 61, 62, 63, 65 are indicated as sol0, sol1, sol2, sol3 on the diagram.

The control unit 39 transmits an operation signal value to the solenoid valves 61, 62, 63, 65, and each solenoid valve

61, 62, 63, 65 individually turns on/off within 0.01 seconds to shift the clutch from engagement to disengagement. Accordingly, as the actuator module 40 moves wholly, the sensor unit 71 can perform position detection.

Figure 15:
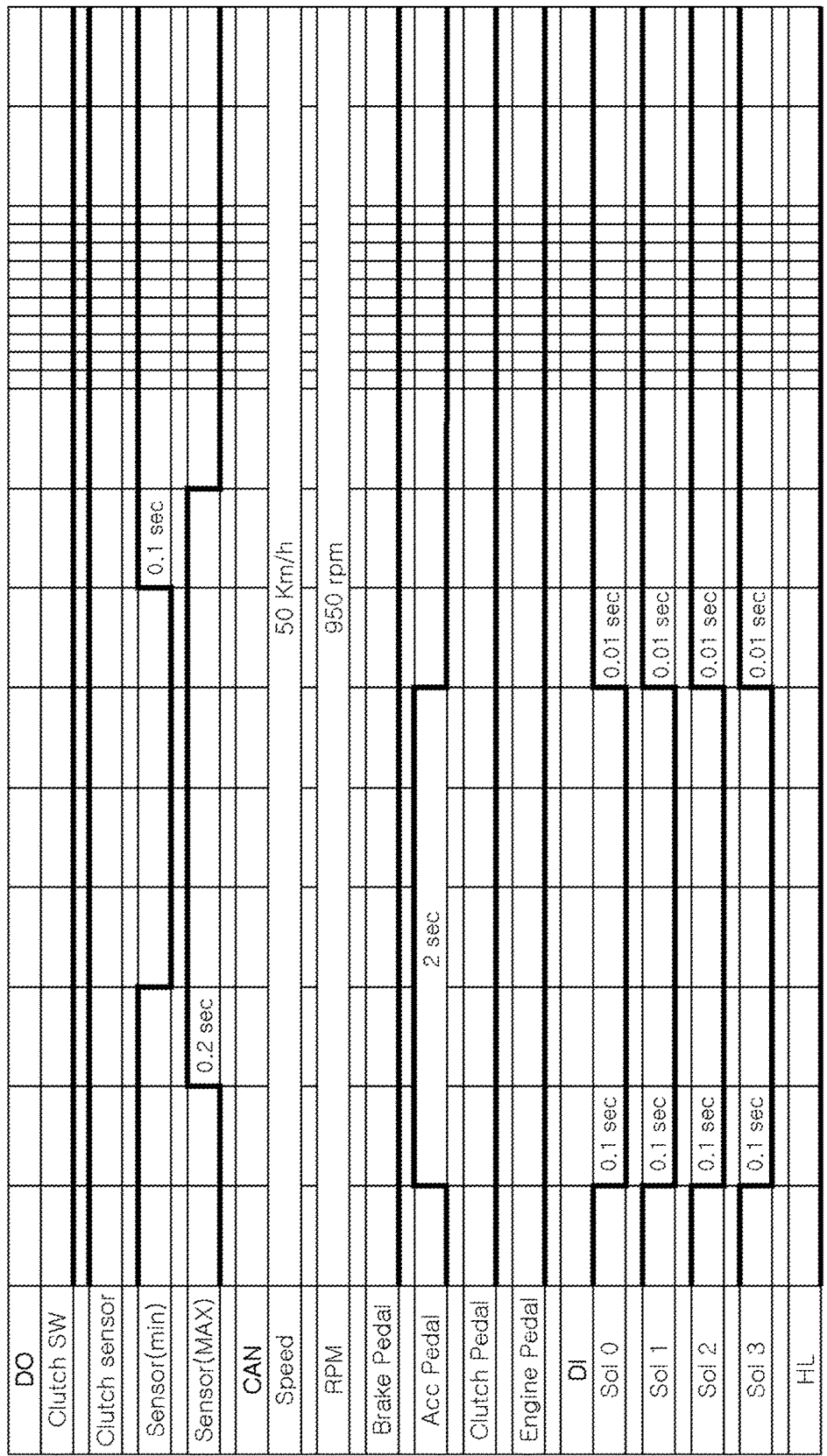

Referring to FIG. 15, when the accelerator pedal is pressed for about 2 seconds while coasting, for acceleration of the vehicle, the clutch is engaged to transmit the driving power, and when the accelerator pedal is released, the clutch is disengaged again.

Figure 16:
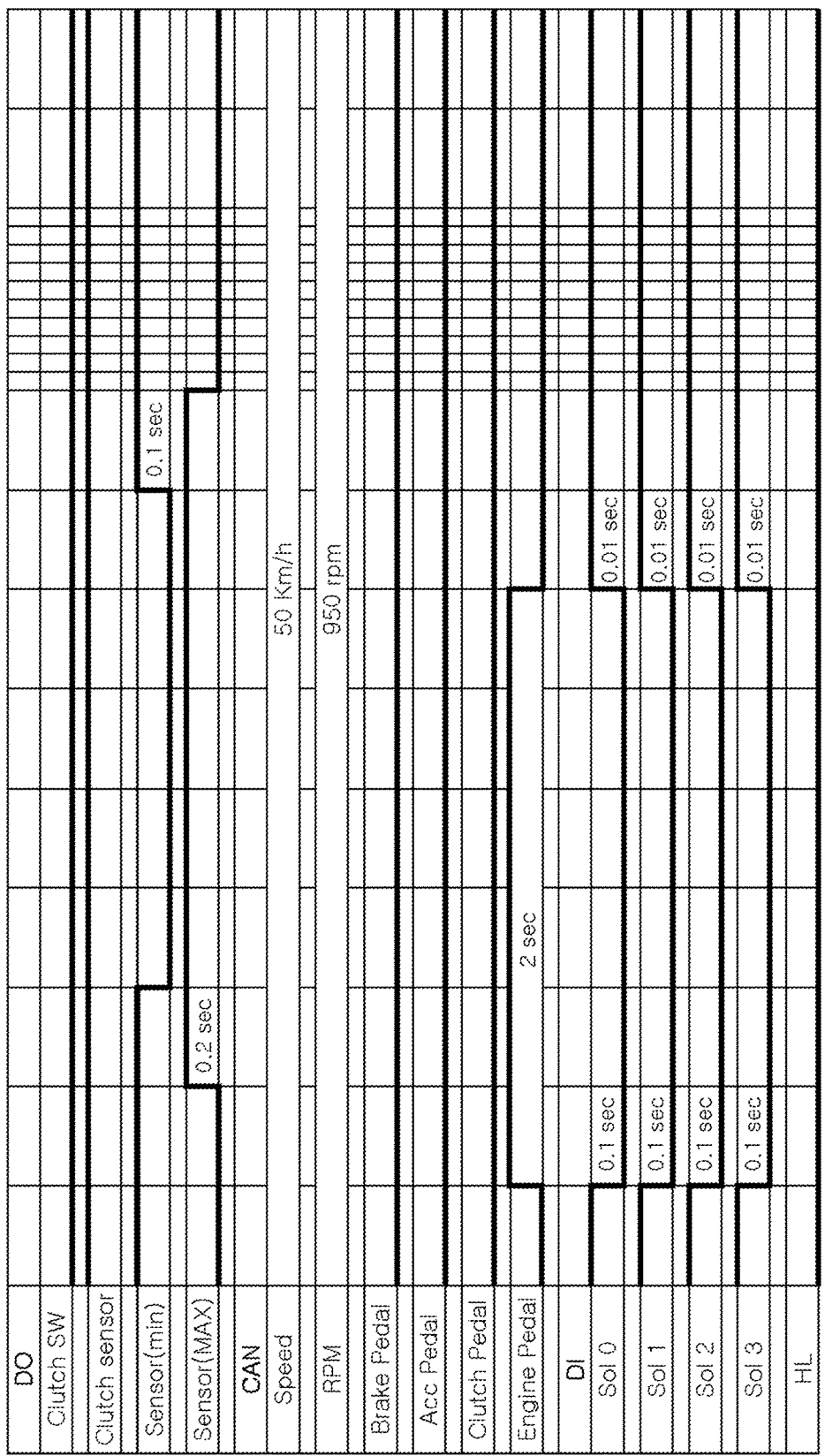

Referring to FIG. 16, when the engine brake operates for about 2 seconds in coasting condition, the clutch is engaged to transmit the brake power by the driving power, and when the engine brake is released, the clutch is disengaged to maintain the coasting condition again.

Figure 17:
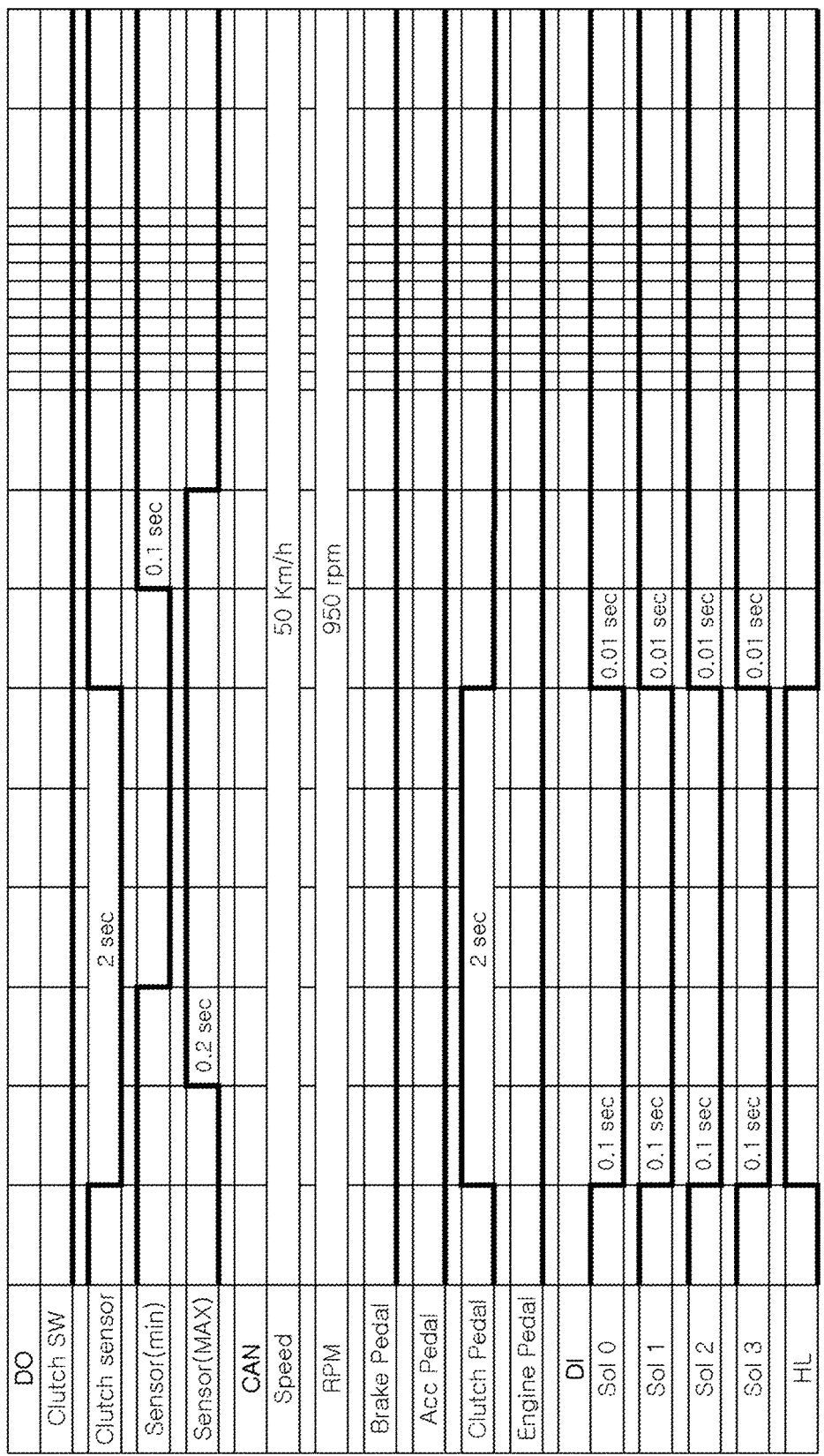

Referring to FIG. 17, when the clutch pedal is pressed for about 2 seconds in coasting condition, the semi-auto clutch is maintained in initial state for the 2 seconds and is operated by the clutch pedal, and when the clutch pedal is released, the semi-auto clutch is allowed to operate to disengage the clutch.

Figure 18:
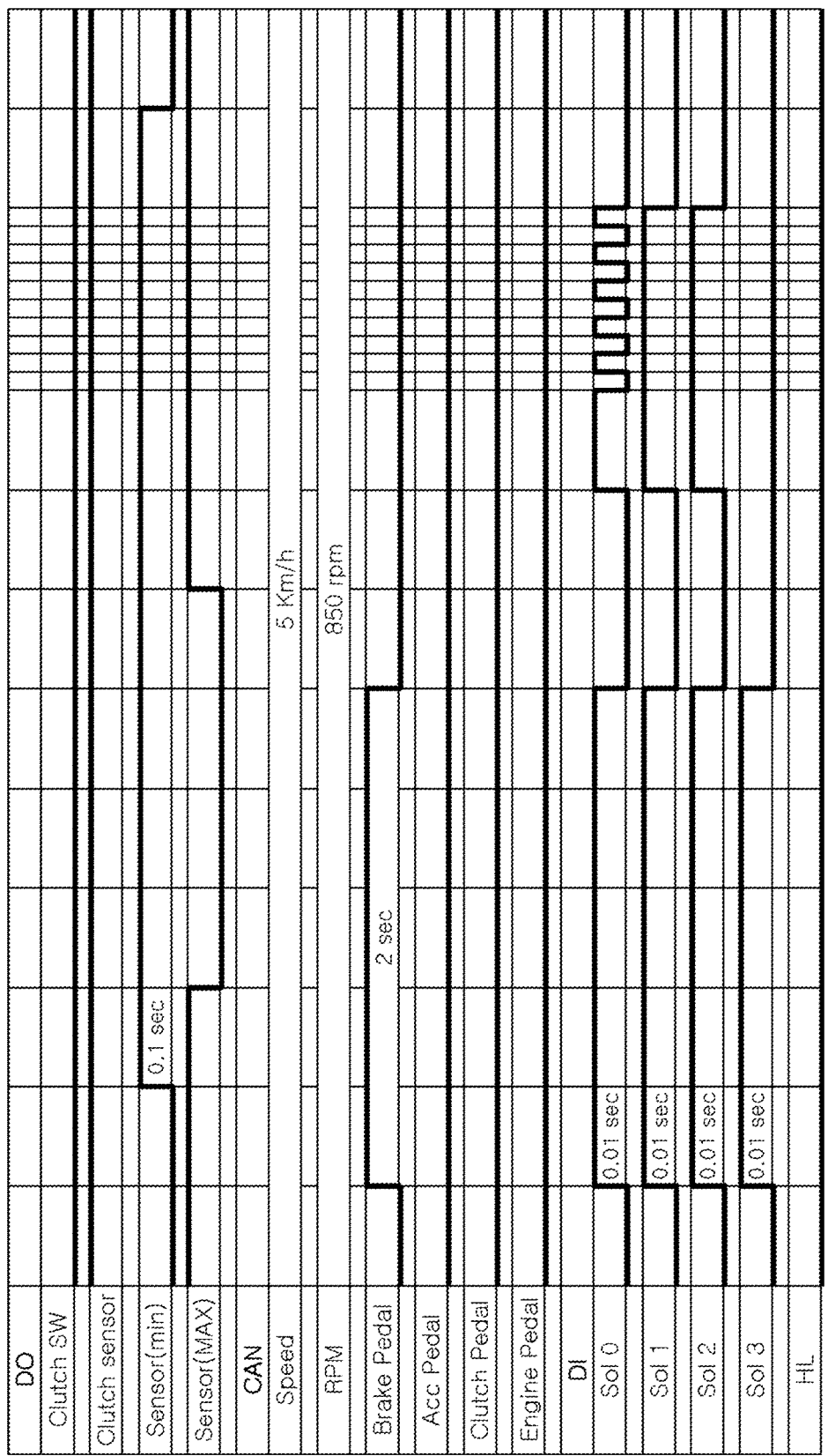

Referring to FIG. 18, while coasting at low speed of 10 km/h or less and the engine rotation frequency of 900 rpm or less, in the case that the brake pedal is pressed for about 2 seconds and then released, if the brake pedal is pressed while coasting at low speeds, the clutch pedal is disengaged, and if the brake pedal is released, the clutch pedal is engaged after maintaining at half clutch.

It should be noted that the scope of the present disclosure is not limited to the disclosed embodiments, the technical spirit of the present disclosure falls within the scope of the present disclosure, and the protection scope of the present disclosure is defined by the appended claims.

The invention claimed is:

1. A method for fuel reduction of vehicle using a fuel reducing clutch control apparatus that is connected to a booster cylinder which operates a clutch, wherein the fuel reducing clutch control apparatus comprising:
    a hollow first housing;
    a second housing provided at a rear of the first housing;
    an actuator module placed moveably throughout an inside of the first housing and the second housing;
    a cylinder which is connected to a hydraulic pressure line connected to the booster cylinder, and into which a portion of the actuator module is inserted to supply hydraulic pressure to the hydraulic pressure line with the movement of the actuator module;
    a position sensor which measures a straight line distance of the actuator module moving in the first housing;
    a pressure regulation unit provided in the first housing to regulate pressure; and
    a control unit which controls the pressure of the pressure regulation unit according to the distance measured by the position sensor,
    wherein the control unit is connected to an Engine Control Unit (ECU) of a vehicle via Controller Area Network (CAN) communication to collect information associated with a brake pedal, an accelerator pedal, a clutch pedal, a clearance of an engine brake, a vehicle speed, an engine rotation frequency and an amount of fuel supply, and receives input of a position signal of the actuator module through the position sensor, and controls solenoid valves which form the pressure regulation unit for operation of the actuator module,
    wherein the method comprising the steps of:
    attaching the fuel reducing clutch control apparatus onto the clutch for improved fuel efficiency of the vehicle through automatic control, and setting an operation mode on the control unit, the operation mode being divided into normal driving condition and coasting condition;
    receiving, by the control unit, measured vehicle speed and engine rotation frequency information from the ECU of the vehicle via CAN communication; and
    determining whether the measured vehicle speed and engine rotation frequency is higher than or equal to a reference value preset to the control unit,
    wherein when the measured vehicle speed and engine rotation frequency is determined to be higher than or equal to the reference value, the coasting condition is performed, and the coasting condition comprises:
    a first mode in which when the accelerator pedal is pressed while coasting, the clutch is engaged to transmit driving power for acceleration of the vehicle, and when the accelerator pedal is released, the clutch is disengaged again,
    a second mode in which when the engine brake operates while coasting, the clutch is engaged to transmits brake power by driving power, and when the engine brake is released, the clutch is disengaged to maintain the coasting condition again, and
    a third mode in which when the clutch pedal is pressed while coasting, a semi-auto clutch is maintained in initial state and operated by the clutch pedal, and when the clutch pedal is released, the semi-auto clutch is allowed to operate to disengage the clutch.

2. The method for fuel reduction of vehicle of claim 1, wherein the reference value preset to the control unit supplies only fuel corresponding to engine rotation frequency of basic Revolution Per Minute (RPM), which is defined as 800-900 rpm with running engine while the vehicle is stationary when the accelerator pedal is pressed while driving, so that fuel is reduced by as much as a coasting distance.

3. The method for fuel reduction of vehicle of claim 1, wherein the actuator module comprises:
    a body which is moveable in a straight direction within the first housing and is provided with a hydraulic pressure regulating rod in front thereof,
    a cylinder which is connected to a hydraulic pressure line connected to the booster cylinder, and into which a portion of the hydraulic pressure regulating rod is inserted to supply hydraulic pressure to the hydraulic pressure line with the movement of the body,
    a piston head which is moveable in a straight direction within the second housing by a pressure difference between a first chamber and a second chamber, wherein the second housing is divided into the first chamber and the second chamber, each chamber being sealed, and
    a piston rod which connects the piston head to the body.

4. The method for fuel reduction of vehicle of claim 1, wherein the pressure regulation unit is connected to a compression pump disposed outside through an air passage pipe, and
    the pressure regulation unit comprises:
    a plurality of orifices through which air flows between the air passage pipe and the second housing, and
    a plurality of solenoid valves which is controlled according to a signal of the control unit and regulates opening and closing of the plurality of orifices.

5. The method for fuel reduction of vehicle of claim 3, wherein the fuel reducing clutch control apparatus further comprises:
    a reflection plate which moves with the body,
    wherein the sensor unit is fixed to the first housing to measure a straight distance from the reflection plate.

6. The method for fuel reduction of vehicle of claim 3, wherein the fuel reducing clutch control apparatus further comprises:

an elastic member provided in the second chamber, wherein the elastic member has a restoring force to push the piston head toward the first chamber.

7. The method for fuel reduction of vehicle of claim 3, wherein the fuel reducing clutch control apparatus further comprises:

a valve which connects the cylinder to a master cylinder configured to supply hydraulic pressure by manipulation of a clutch pedal, and a sensor which recognizes whether the clutch pedal is pressed, wherein when the clutch pedal being pressed is recognized through the sensor, the valve is opened, operation of the compression pump is stopped by the control unit, and the solenoid valves are opened.

\* \* \* \* \*